United States Patent Office 2,906,782
Patented Sept. 29, 1959

2,906,782

STABILIZATION OF THE TRICHLOROETHYLENE AND STABILIZING PRODUCT THEREFOR

Antonio Ferri and Germano Patron, Milan, Italy, assignors to Sicedison S.p.A., Milan, Italy No Drawing. Application December 21, 1956
Serial No. 629,790

10 Claims. (Cl. 260—652.5)

The present invention pertains to a method for preventing or inhibiting the decomposition of the trichloroethylene, as it occurs especially in the degreasing processes for metals.

It is well known that the trichloroethylene is a very unstable compound; the more or less associated effect of the humidity, the air, the light and the heating causes decomposition phenomena and hence formation of hydrochloric acid, phosgene, carbon oxide, dichloroacetylchloride. Due to the presence of metallic surfaces as iron and aluminum, these phenomena may increase considerably and they are autocatalytic. On the other hand the hydrochloric acid chemically attacks the metals by forming the relative chlorides, which come into contact with the trichloroethylene as for instance in the degreasing processes; such chlorides, particularly the aluminum and iron chlorides cause in turn an increasing of the above mentioned decomposition processes as well as a more or less intense coloration due to the polymerisation-condensation products.

The object of the present invention is to provide a stabilising product for the trichloroethylene which prevents the decomposition reactions of the solvent from taking place especially upon heat addition, in the presence of metals, humidity, oxygen and the light.

The present invention is based on the observation of the fact that a definite synergic effect intended to stabilize the trichloroethylene may be obtained by adding small quantities of di-isopropylamine and p-1tertiary-butyl- catechol to the trichloroethylene. As it is well known the added products present the following structure formulae:

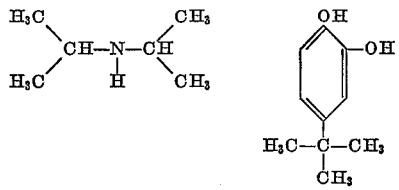

Example I

Four samples of 200 cc. of trichloroethylene, stabilised by different methods, are taken and namely: the trichloroethylene "A" contains a normal stabilising product (pyridine), while the trichloroethylene named "B" "C" and "D," besides containing the same stabilising element as the trichloroethylene "A," contain respectively:

Trichloroethylene "B"+0.005% di-isopropylamine
Trichloroethylene "C"+0.005% p-tertiary-butyl-catechol
Trichloroethylene "D"+0.005% di-isopropylamine +0.005% p-tertiary-butyl-catechol The stability test consists in boiling with down fall cooler the trichloroethylene samples for 24 hours, in containers of 500 cc., the heating source being a 150 watt sanded lamp placed below the containers.

During the test water saturated oxygen was poured at a speed of 10/bubbles minute through a 3 mm. diameter glass pipe into the trichloroethylene.

The results of the stability tests performed on the four above mentioned samples are reported in the following table:

Table I

| Type of trichlorethylene | Characteristics of the trichloroethylene after the stability tests | |
|---|---|---|
| | pH | Color |
| "A"—0.01% pyridine | 2.2 | Black. |
| "B"—0.01% pyridine, 0.005% di-isopropylamine. | 2.5 | Red-black. |
| "C"—0.01% pyridine, 0.005% p-tertiary-butyl-catechol. | 2.3 | Intense dark red. |
| "D"—0.01% pyridine, 0.005% di-isopropylamine, 0.005% p-tertiary-butyl-catechol. | 9.8 | Colorless. |

Similar results are obtained by using instead of the p-tertiary-butyl-catechol, its monomethyl-ether (tertiary-butyl-guaiacol) in its isomer forms:

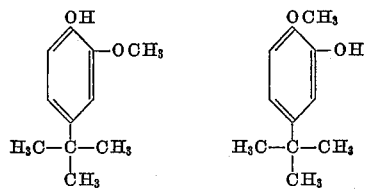

What we claim is:

1. A method for stabilizing trichloroethylene comprising the steps of preparing a synergistic mixture of pyridine p-tertiary-butylcatechol and di-isopropylamine, and intimately mixing said mixture with the trichloroethylene to be stabilized.

2. A method as described in claim 1, characterized in that p-tertiary-butylcatechol and di-isopropylamine are each added to trichloroethylene in amounts ranging from 0.001 to 0.1% of the amount of trichloroethylene.

3. A method for stabilizing trichloroethylene comprising the steps of preparing a synergistic mixture of pyridine, a monomethyl ether of p-tertiary-butylcatechol and di-isopropylamine, and intimately mixing said mixture with the trichloroethylene to be stabilized.

4. A stable trichloroethylene containing, in intimate mixture therewith, a synergistic adjuvant consisting of pyridine, p-tertiary-butylcatechol and di-isopropylamine.

5. A stable trichloroethylene containing, in intimate mixture therewith, a synergistic adjuvant consisting of pyridine, a monomethyl ether of p-tertiary-butylcatechol and di-isopropylamine.

6. A method for stabilizing trichloroethylene, comprising the steps of preparing a synergistic mixture of pyridine, di-isopropylamine and a catechol derivative selected from the group consisting of p-tertiary-butylcatechol and the monomethyl ethers of the latter, and intimately mixing said mixture with the trichloroethylene to be stabilized.

7. A stable trichloroethylene containing, in intimate mixture therewith, a synergistic adjuvant consisting of pyridine, di-isopropylamine and a catechol derivative selected from the group consisting of p-tertiary-butylcatechol and the monomethyl ethers of the latter.

8. A method for stabilizing trichloroethylene, comprising the steps of preparing a synergistic mixture of pyridine, di-isopropylamine and a catechol derivative selected from the group consisting of p-tertiary-butylcatechol and the monomethylethers of the latter, and intimately admixing said mixture in such amount to trichloroethylene as to add from 0.001 to 0.1% of each of the components of the mixture to the amount of trichloroethylene to be stabilized, thereby obtaining a product which remains colorless after boiling for 24 hours and then has a pH of 9.8.

9. A stable trichloroethylene containing, in intimate mixture therewith, a synergistic adjuvant consisting of pyridine di-isopropylamine and a catechol derivative selected from the group consisting of p-tertiary-butylcatechol and the monomethyl ethers of the latter, each of the two adjuvant components being admixed in amounts of from 0.001 to 0.1% of the amount of trichloroethylene, said trichloroethylene remaining colorless even after boiling for 24 hours and then having a pH of 9.8.

10. A synergistic mixture for use as a stabilizing agent of trichloroethylene comprising pyridine di-isopropylamine and a catechol derivative selected from the group consisting of p-tertiary-butylcatechol and the monomethyl ethers of the latter.

References Cited in the file of this patent

FOREIGN PATENTS 732,569     France _____ June 20, 1932